United States Patent Office 3,426,597
Patented Feb. 11, 1969

3,426,597
PRESSURE GAUGE
Leopold Heijne and Adrianus Teunis Vink, Emmasingel, Eindhoven, Netherlands, assignors to North American Philips Company, Inc., New York, N.Y., a corporation of Delaware
Filed Apr. 3, 1967, Ser. No. 627,926
Claims priority, application Germany, Apr. 19, 1966, N 28,399
U.S. Cl. 73—399                    3 Claims
Int. Cl. G01l 21/12

ABSTRACT OF THE DISCLOSURE

A "Pirani" manometer in which natural convection occurs along a hot wire due to rarefaction of gases upon heating, which convection is ensured by curving the envelope above the wire.

---

The invention relates to a device for measuring pressures of gases and vapors.

More particularly, the invention relates to a device known as a Pirani manometer, in which a heating wire is horizontally arranged in an envelope, and is frequently used for measuring gas and vapor pressures of approximately $10^{-4}$ to 10 torr.

In the conventional construction, there is no significant difference between the indications of 10 torr and 1 atm. (for air). This is due to the fact that the heat conductivity of gases is not dependent upon the pressure in this pressure range, which can be proved by means of the elementary kinetic gas theory (cf., for example, S. Chapman and T. G. Cowling "The Mathematical Theory of Non-Uniform Gases," Cambridge (England), The University Press, 1939).

Nevertheless, in order to obtain a significant sensitivity above approximately 10 torr, use may be made of convection which is achieved, in a known manometer, by means of a vibrating vane in the proximity of the measuring wire (or measuring resistor having a negative temperature coefficient).

The object of the invention is to provide a manometer which utilizes natural convection occurring along a hot wire due to the rarefaction of a gas upon heating.

The invention provides steps which are in contrast to the steps for preventing natural convection recommended in literature (cf., for example, Phil. Mag., March 1926, pages 593–606, more particularly page 595).

In accordance with the invention the wall of the envelope of a manometer above the wire has a gradual curvature of a radius between 2 cm. and 10 cm., the active part of the wire the resistance of which is measured being spaced from said upper wall by at least 0.5 cm.

The invention is based on the discovery that a suitable position of the wire with respect to the envelope and a suitable shape of the envelope provide a stable and reproducible convection pattern of the gases or vapors to be measured and thus extend the pressure range which can be measured with precision.

The invention will now be described more fully with reference to the drawing, in which.

Figure 1:
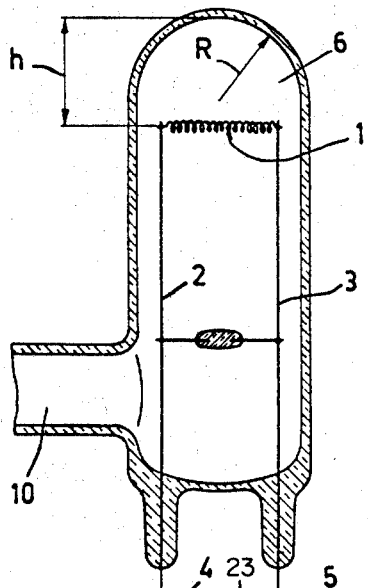
FIG. 1 shows one embodiment of a manometer in accord with the invention.

Referring now to FIG. 1, a heating wire which may consist, for example, of platinum or of a carbide is connected between two pins 2 and 3 between which a battery 22, or other source of electrical current is connected and which consists, for example, of nickel and is accommodated in a space 6. The envelope portion 11 of the manometer above the wire 1 has a spherical curvature of a radius R. The connection between the manometer and the space in which the gas pressure must be measured is designated by 10.

Figure 2:
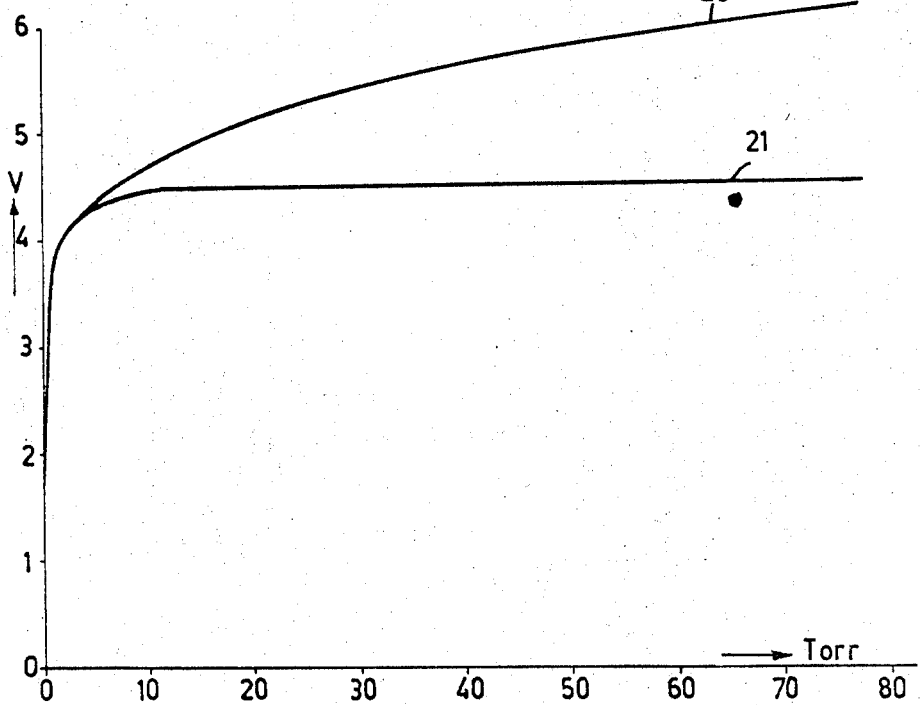
FIG. 2 shows the voltage across the heating wire as a function of pressure.
Figure 1A:
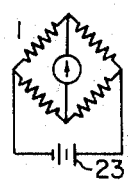
FIG. 1a shows a circuit for measuring pressure.

The heating wire 1 constitutes one of the branches of a Wheatstone bridge (see FIG. 1a) which is balanced at the prevailing gas pressure. The curve 20 of FIG. 2 representing the voltage required across the wire as a function of pressure for this state of equilibrium clearly illustrates the improvement with respect to the calibration curve of a known kind of manometer, which latter curve is denoted by 21.

In one embodiment of the invention the wire 1 had an axial length of 30 mm. The radius R was 16 mm., the distance $h$ between the wire 1 and the upper wall of the manometer was 32 mm.

The wall above the wire may also have a cylindrical shape; the axis of the cylinder is then parallel to the axis of the wire.

According to a further embodiment of the invention, a second wire may be provided. This may be done for two reasons:

(1) The required increase in temperature of the wire is not permissible when the gas atmosphere to be measured contains substances which would be fully dissociated (for example, oil or grease vapors). Due to the deposition of dissociation products on the wire, the radiation properties of said wire would then be influenced so that the calibration curve is varied.

(2) Only a limited pressure range of a given gas (for example, of a few tens to a few hundreds of torr) is concerned and in this range, the maximum sensitivity of the device is required.

Electric energy is supplied to this second wire ("heating wire") so that this wire also determines the pattern of natural convection along the first wire (measuring wire).

According to a feature of the invention, the wires are arranged vertically one above the other.

In the range of low pressures in which convection does not yet occur, the heat transfer between the two wires is solely determined by the distance between the two wires and, of course, by their dimensions.

At higher pressures, however, convection exerts an influence and not only the relative distance, but also the relative position with respect to the perpendicular line is of major importance. It makes a great difference, for example, whether the measuring wire is arranged above or below the heating wire.

Figure 3:
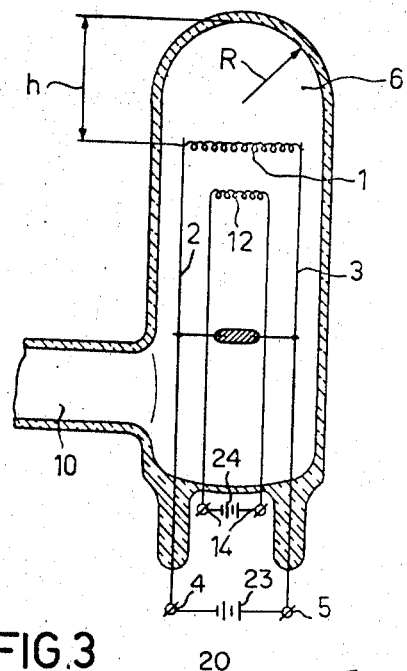
FIG. 3 shows another embodiment of a manometer according to the invention.

Both wires must be connected to an electrical measuring and supply device. In this respect, various modifications are possible one of which is shown in FIG. 3 in which the reference numerals refer to the same parts as in FIG. 1 except 12 which is a second heating wire, connected to terminals 14 between which a battery 24 is provided. The "heating wire" may be supplied with a constant voltage or a constant current or with a voltage depending upon the pressure. In the latter case, for example, this wire may be connected to a supply device which keeps the temperature of the wire constant by means of an automatic control mechanism.

Efficient circuit arrangements are stated in literature (cf., J. H. Leck and C. S. Martin "Rev. Sci. Inst." 28, page 119 (1957), J. H. Leck "J. Sci. Inst." 35, page 107 (1958), C. N. W. Litting "J. Sci. Inst." 32, page 91 (1955), A. R. Hamilton "Rev. Sci. Inst." 28, page 693 (1957)).

The above possibilities of supplying the measuring wire also exist which generally forms part of a Wheatstone bridge. The two wires re kept at a generally different temperature independent of the pressure in that they are each connected to a control device of the kind described above.

The temperature of the measuring wire is chosen to be lower than 100° C. so that the risk of a dissociation of vapors and of a deposition of dissociation products on the wire is small.

The measuring wire is preferably arranged above the heating wire.

What is claimed is:

1. In a device for measuring pressure of a gaseous medium, the combination comprising an envelope defining a measuring chamber, means for introducing the gaseous medium into the envelope, a temperature variable sensing resistive wire element resistant to attack by said gaseous medium disposed within said envelope and spaced from one wall of said envelope having a curvature with a radius between about 2 and 10 cm. said wire element being spaced from said curved envelope wall a distance of at least 0.5 cm. to promote natural convection of the gas about said wire when said wire is heated, means to apply a potential between the ends of said wire element to heat the same, and means external to the envelope to measure and compare the resistance of said wire element with that obtained under like conditions with a gaseous medium of like composition at a known pressure.

2. A device as claimed in claim 1, in which the material of the wire resistant to chemical attack is a carbide.

3. A device as claimed in claim 1, in which a second wire element is positioned in the envelope beneath the first wire element, and means are included to supply current to said second wire element to heat the same to a temperature higher than said first wire element.

References Cited

UNITED STATES PATENTS

| | | | |
|---|---|---|---|
| 1,448,540 | 3/1923 | Housekeeper | 73—399 |
| 3,199,356 | 8/1965 | Andriulis | 73—399 |

LOUIS R. PRINCE, *Primary Examiner.*

DONALD O. WOODIEL, *Assistant Examiner.*